US011161764B2

(12) United States Patent
Fricker et al.

(10) Patent No.: US 11,161,764 B2
(45) Date of Patent: Nov. 2, 2021

(54) COMBUSTION METHOD APPLIED TO MELTING MATERIALS SUCH AS GLASS IN AN END-FIRED FURNACE

(71) Applicant: ENGIE, Courbevoie (FR)

(72) Inventors: Neil Fricker, Dorridge (GB); Richard Stanley Pont, Pathhead Lothian (GB); Isabelle Alliat, Paris (FR); Thierry Laplace, Aulnay sous Bois (FR); Thierry Bellin-Croyat, Montmorency (FR)

(73) Assignee: ENGIE, Courbevoie (FR)

( * ) Notice: Subject to any disclaimer, the term of this patent is extended or adjusted under 35 U.S.C. 154(b) by 0 days.

(21) Appl. No.: 16/745,616

(22) Filed: Jan. 17, 2020

(65) Prior Publication Data
US 2020/0148572 A1 May 14, 2020

Related U.S. Application Data

(63) Continuation of application No. PCT/EP2018/069819, filed on Jul. 20, 2018.

(30) Foreign Application Priority Data

Jul. 21, 2017 (EP) .................................... 17305979

(51) Int. Cl.
*C03B 5/16* (2006.01)
*F27B 5/16* (2006.01)
(Continued)

(52) U.S. Cl.
CPC ................ *C03B 5/235* (2013.01); *C03B 5/04* (2013.01)

(58) Field of Classification Search
CPC ........... C03B 5/16; C03B 5/167; C03B 5/235; C03B 5/237; C03B 5/435; F23L 15/02;
(Continued)

(56) References Cited

U.S. PATENT DOCUMENTS 4,599,100 A    7/1986   Demarest, Jr.
4,909,727 A *   3/1990   Khinkis ................ C03B 5/2353
                                                    431/10

(Continued)

FOREIGN PATENT DOCUMENTS

EP       0599548 B1    7/1997
JP       H05180409 A    7/1993
(Continued)

OTHER PUBLICATIONS

Fricker et al., "A Method of Melting Raw Materials Such as Glass By a Cross-Fired Melting Furnace", U.S. Appl. No. 16/747,395, filed Jan. 20, 2020, 35 pages.
(Continued)

*Primary Examiner* — Gregory A Wilson

(57) ABSTRACT

An end-fired melting furnace and a method of melting raw materials by an end-fired melting furnace are provided, where the furnace includes a melting tank, a melting chamber, first and second ports, at least one burner, and at least one auxiliary fuel injector arranged in the end-fired melting furnace in a roof or in first and second side walls so that the at least one auxiliary fuel injector introduces a fraction X2 of auxiliary fuel, in a direction of re-circulating combustion products, without additional oxidiser, into the re-circulating combustion products in a direction of a flow of the re-circulating combustion products, and with a chosen velocity such that the fraction X2 of auxiliary fuel mixes with the re-circulating combustion products before being combusted by oxidiser entering the furnace.

20 Claims, 4 Drawing Sheets

(51) Int. Cl.
*C03B 5/235* (2006.01)
*C03B 5/04* (2006.01)

(58) Field of Classification Search
CPC .... F23L 15/04; F27B 5/16; F27B 3/22; F27B 3/225; F27B 3/263
See application file for complete search history.

(56) References Cited

U.S. PATENT DOCUMENTS

| | | | |
|---|---|---|---|
| 5,139,558 A * | 8/1992 | Lauwers | C03B 5/2353 65/134.4 |
| 5,755,846 A * | 5/1998 | Wagner | C03B 5/235 65/134.4 |
| 5,823,769 A * | 10/1998 | Joshi | C03B 5/235 432/181 |
| 5,833,447 A * | 11/1998 | Bodelin | F23M 5/025 431/10 |
| 5,893,940 A | 4/1999 | Tsai | |
| 5,906,119 A * | 5/1999 | Boillet | C03B 5/2353 65/134.4 |
| 5,931,653 A | 8/1999 | Nakamachi | |
| 6,047,565 A | 4/2000 | Moreau | |
| 7,946,129 B2 * | 5/2011 | Wu | C03B 5/2353 65/134.4 |
| 9,188,333 B2 * | 11/2015 | Galley | C03B 5/235 |
| 2013/0011805 A1 * | 1/2013 | Ward | C03B 5/235 432/13 |
| 2016/0003543 A1 | 1/2016 | Simpson et al. | |

FOREIGN PATENT DOCUMENTS

| | | |
|---|---|---|
| JP | H05180410 A | 7/1993 |
| JP | H08208240 A | 8/1996 |
| WO | 2008074961 A2 | 6/2008 |

OTHER PUBLICATIONS

International Search Report and Written Opinion of the International Searching Authority regarding International Patent Application No. PCT/EP2018/069819 dated Sep. 24, 2018, 10 pages.
International Search Report and Written Opinion of the International Searching Authority regarding International Patent Application No. PCT/EP2018/069813 dated Sep. 24, 2018, 9 pages.

* cited by examiner

COMBUSTION METHOD APPLIED TO MELTING MATERIALS SUCH AS GLASS IN AN END-FIRED FURNACE

CROSS-REFERENCE TO RELATED APPLICATIONS AND PRIORITY CLAIM

This application claims priority as a continuation of International Patent Application No. PCT/EP2018/069819 filed on Jul. 20, 2018, which claims priority to European Patent Application No. 17305979.1 filed on Jul. 21, 2017. Both of these applications are hereby incorporated by reference in their entirety.

BACKGROUND OF THE INVENTION

Field of the Invention

The present invention relates to a combustion method applied to a method of melting raw materials, for example glass, in an end-fired furnace and more specifically relates to a method aiming at reducing the formation of nitrogen oxides (NOx) in the flames used during the melting of the raw materials.

The invention further relates to an end-fired melting furnace implementing such a method aiming at reducing the emission of NOx.

Description of the Related Art

Several types of melting furnaces for producing different types of glass or other materials are known, including end-fired furnaces. In these furnaces, the flame, which is sometimes called a "horseshoe flame", and the flow of combustion products define a U-shape.

It should be noted that end-fired furnaces are sometimes referred to by the skilled person as "end-port furnaces" or "U-flame furnaces". Hereinafter, the terms "end-fired", "end-port" and "U-flame" may be equivalently used to describe one and the same type of furnace.

The following terms may be used in the present description. The following definitions are only given by way of example:

Melting furnace, for example glass melting furnace: consists of a molten material bath covered by a combustion chamber in which fuel is combusted to generate the heat for melting the raw materials.

Regenerative melting furnace, for example regenerative glass melting furnace: a furnace which is fitted with packed chambers connected to exhaust ports and inlet ports and which reverses firing direction at regular intervals so that the exhaust gases heat the packing and the oxidiser (for example combustion air) is heated by the packing alternately.

Recuperative melting furnace, for example recuperative glass melting furnace: a furnace which fires continuously in one direction where the oxidiser is heated by a separate recuperative heat exchanger.

End-fired furnace: a melting furnace where the oxidiser and the exhaust ports are located on the same end wall.

Back wall of an end-fired furnace: the wall in which the oxidiser is introduced by inlet ports and where exhaust ports are located.

Front wall: the wall that opposes the back wall, usually the molten material in the bath is discharged below the front wall.

Port: the channel used to introduce oxidiser into the melting chamber (so called 'inlet port') or to remove combustion products from the melting chamber (so called 'exhaust port'). In a reversing end-fired furnace, a pair of ports located on the back wall operate alternately as inlet port and exhaust port.

Burner: the device associated with the port or with ports that usually injects the fuel for melting of the raw materials. There may be more than one burner associated with a given port. Burners may be located in the following positions: under port-burners below the port, side of port-burners located in the side of the port, through port-burners located within the port.

Auxiliary fuel injector: a device to inject auxiliary fuel into the melting chamber.

Combustion products: the gases resulting from the combustion of the fuel with oxidiser, typically having a proportion of oxygen of generally less than 5% and more typically less than 2.5%.

Re-circulating combustion products: the flow of combustion products that returns towards the combustion inlet port in the space between the roof and the flame. In an end-fired furnace the flow is in a horizontal plane.

Biofuel: a fuel derived from renewable biomass. Biofuels may be gaseous, liquid or solid.

Oxidiser: the fluid used to combust the fuel, usually air.

End-fired furnaces are typically operated with regenerative heat exchangers using alternately two ports located alongside each other on one wall (the back wall) of the furnace. During first periods of time (typically between 10 and 30 minutes) fuel and an oxidiser such as air are supplied to only a first one of the two ports, while combustion products are exhausted via the exhaust port. During alternate second period of time (also typically between 10 and 30 minutes) fuel and an oxidiser such as air are supplied to the other of the two ports, while the combustion products are exhausted via the exhaust port associated with the first burner. The ports act alternately as inlet ports or as exhaust ports.

Each port has associated with it one or more burners. The burners feed the fuel in through or near (usually under) the port serving as an inlet for the oxidiser. The burners in or near the exhaust port are idle. Fuel supply to the two sets of burners alternates in synchronisation with the oxidiser flow.

A regenerator is connected upstream from the supply opening of an inlet port in the supply path of the oxidiser. The exhaust side regenerator is heated by the outgoing exhaust gases. After the furnace firing direction is reversed, the hot regenerator heats the incoming oxidiser. This process of heat recovery into the incoming oxidiser increases the thermal efficiency of the melting furnace and ensures the achievement of the high temperatures needed to melt the raw materials (circa 1500° C., 2700° F.).

When the oxidiser is air, as is usually the case on industrial glass melting furnaces, Nitrogen Oxides (NOx), a regulated air pollutant, usually arise during the combustion of the fuel and oxidiser mixture. The nitrogen in the air combines with the oxygen in the air at the high temperatures found in glass melting furnace flames to form 'thermal NOx'. In the case of regenerative glass melting furnaces, concentrations of NOx in the exhaust gases are typically in the range of 750 to 2500 mg/Nm3 at 8% O2, the standard condition for comparing NOx emissions.

It is important to try to reduce the nitrogen oxide fraction in the exhaust gas to meet the limit of 500 mg/Nm3@8% O2 set by current or imminent emissions regulations in many parts of the world. This requires 'as found' NOx emissions to be reduced by between 30% and 80%.

The option commonly deployed to reduce the NOx emissions from glass melting furnaces (or other types of furnaces) is post-treatment of the exhaust gas. However, such exhaust gas purification devices are costly and constitute additional equipment which requires additional space and high operating and maintenance cost. Typically, a selective catalytic reduction (SCR) plant to achieve up to 90% NOx reduction on a large end-fired glass melting furnace has a capital cost of one million Euros and annual operating costs of about €100,000. It requires the replacement of about ⅓ of the catalyst each year. It also requires the use of ammonia (NH3 or urea) as a reducing agent, a fluid that is itself a regulated pollutant. A lower capital alternative is selective non-catalytic reduction (SNCR) carried out inside the exhaust regenerator. SNCR uses ammonia or urea to react with the NOx and decompose the NOx. It must be carried out at a very particular temperature between 870° C. and 1090° C. Above this temperature the ammonia reacts to produce more NOx, while below it the ammonia leaves the regenerator unreacted to add to the emissions from the plant. On a reversing regenerative glass melting furnace, the right conditions for effective SNCR exist only for a small portion of the regenerative cycle at any given location in the regenerator. This renders SNCR quite ineffective.

Tsai (EP 0882488 and U.S. Pat. No. 5,893,940) introduces additional fuel and oxidiser into the exhaust gases in an attempt to stabilise their temperature entering the regenerative heat exchanger and thus to extend the portion of the furnace cycle for which SNCR is effective. The method works although is very difficult to control the temperature within the required range. Thus the effectiveness of Tsai's approach is limited and in addition it adds to the cost of the ammonia by increasing the fuel consumption and CO2 emissions of the furnace by several percentage points.

A more successful approach to cleaning up the exhaust gas after it leaves the melting chamber has been the addition of excess fuel either to the exhaust or within the melting chamber so that there is insufficient oxidiser available for complete combustion. In this circumstance, carbon monoxide (CO) and Hydrogen (H) is formed in the exhaust (reducing atmosphere), and these reduce NOx to nitrogen (N2) and carbon dioxide (CO2) and water (H2O) in the exhaust port and within the regenerators. Air must be introduced at the downstream end of the regenerator (sometimes called "over fired air") to burn the excess CO (another regulated pollutant) and to try to recover part of the heat lost in the additional fuel.

This method, called "reburning fuel technology", was originally proposed by Quirk (EP0599548—the so-called 3R process) who used the non-firing burners in or near the exhaust ports to introduce the excess fuel. However, although it has the potential to achieve the required 80% reduction in NOx at a very low capital cost, this is at the price of an increase of between 5% and 15% in fuel consumption and CO2 emissions. The 3R approach also imposes chemical and thermal stress on the regenerators leading to a reduction in regenerator life. For these reasons, this approach has almost been abandoned by the glass industry.

In an attempt to improve this "reburning fuel technology", Ichiraku (JP08208240) proposed a method of reducing NOx using after-burning in the regenerator. In this method excess fuel is injected into the furnace through injectors in the crown or in the exhaust port or, in the case of an End-fired furnace, near the front wall. NOx formed by the conventional burners enters the regenerators in a highly reducing atmosphere which results in decomposition of the NOx into nitrogen and carbon dioxide. A certain time is required for this "After-burning" reaction which is usually complete part way through the regenerator. At this point air may be injected to burn the excess fuel at a relatively low temperature. Some of the heat generated is recovered by the regenerator and some leaves in the higher temperature gases from the regenerator. The technique is similar to the Quirk 3R process except that in 3R the excess gas is injected in the exhaust port neck. It suffers from similar drawbacks and it has not seen widespread application.

In summary, while all the exhaust gas clean up approaches discussed above are capable of achieving the required NOx reductions of up to 80%, they only achieve this at the price of high capital cost, or high running costs, or in some cases both. In addition, the Quirk and Ichiraku approaches lead to a large (circa 10%) increase in CO2 emissions.

An alternative approach is to reduce or avoid the formation of NOx in the melting chamber. Burner tuning, including the reduction of excess oxidiser (removing the available oxygen for the NOx forming reaction) and lengthening the flame (reducing peak flame temperature and hence the rate of NOx formation) is possible, but will typically yield not more than 10% to 20% reduction before high levels of CO appear in the exhaust. This or an associated loss of furnace output prevents their further use.

Moreau (U.S. Pat. No. 6,047,565) proposes to create a "blanket" of inert gas between the oxidiser entering through the inlet port and the fuel entering through the burner, thus delaying combustion of the main fuel producing lower temperatures in the main flame and thus reducing NOx formation. The method applies only to underport firing arrangements where the fuel is introduced through one or more burners situated below the oxidiser ports and the stream of oxidiser flowing through them. Moreau proposes various methods of producing this "blanket". Usually the "Blanket" is formed in or below the combustion inlet port by introducing at low velocity a small (typically 5% and always less than 30%) quantity of the fuel between the main fuel jet and the oxidiser. The method can produce excessively long flames which do not complete combustion in the furnace and may result in undesirable reducing conditions at the glass surface. U.S. Pat. No. 6,047,565 proposes methods to overcome these undesired effects by injection of high pressure jets of oxygen or air between the main fuel jets and the surface of the molten glass. This is quite a complex arrangement to manage. The total oxidiser supplied through the oxidiser port and the supplementary oxygen lances is held close to or below the amount needed for complete combustion. This fuel rich operation also contributes to reducing the NOx but the inventor gives no indication of the method's effectiveness in reducing NOx.

Nakamura (JPH5180410) reduces the formation of NOx by injecting part of the fuel through two injectors located on the same wall as the combustion air inlet port at a location adjacent to the port and directed in the same direction as the air and flame. Fuel from the two injectors is mixed with re-circulated waste gases which are low in oxygen and therefore burns slowly at a lower temperature resulting in lower NOx formation. In practical terms it is difficult to fit injectors at this location. Due to the proximity of the incoming oxidiser stream, there is insufficient distance available for the injector fuel to mix with the combustion products before encountering and mixing with the combustion air thus reducing the effectiveness of the Nakamura injection method.

Demarest (U.S. Pat. No. 4,599,100) discloses a method for operating a cross-fired melting furnace using excess air firing. In this document, additional fuel is introduced through an additional burner to consume the excess air. The injection of additional fuel in this document is such that the reduction of excess air is on top of the flame so that the area between the flame and the glass remains oxidising and the exhaust from the furnace still contains some excess air. As the total amount of excess air is typically 20% the amount of additional fuel must be small. In order to achieve significant NOx reduction the total excess air must be reduced to very close to stoichiometric which is unlikely using the described technique. Demarest does not specify the amount of NOx reduction obtainable using this method.

Ward (WO 2008/074961 A2) discloses a combustion method for melting glass in which two fuels of the same nature or of different natures are fed into a melting chamber through a burner and an auxiliary injector at two locations remote from each other for distributing the burner fuel and the auxiliary fuel in the melting chamber in order to reduce the NOx emissions, the oxidiser being supplied only at the location of the burner. The method takes advantage of the stream of recirculating combustion products that occupy a substantial fraction of the space above the incoming oxidiser and its burner flames. The design of the ports and the burners is such that these flames lie close to the surface of the molten glass, with the rest of the furnace filled with recirculating exhaust gases into which Ward injects part of the fuel. According to Ward, a portion (from 10% to 100%) of the fuel supplied through the burners is removed and introduced into the recirculating combustion products in such a way and at such a location so as to completely mix with and partially burn in the oxygen poor combustion products before they encounter and completely burn in the incoming oxidiser above the inlet port, a process labelled Auxiliary Injection.

Also, it should be noted that the teachings of Ward are generic and not adapted to the specificities of end-fired melting furnaces.

In addition, the use of the recirculating combustion products of Ward can be improved.

SUMMARY OF THE INVENTION

Objective of the Invention

The present invention proposes and claims new auxiliary injection configurations to prevent the creation of NOx and furthermore to improve on Ward's (WO 2008/074961 A2) combustion process in ways that are specific to end-fired furnace configurations designed for melting various materials.

Summary

The technical problem to be solved is to provide a combustion method for an end-fired melting furnace which remedies the above-mentioned problems or drawbacks and in particular diminishes the creation of NOx while maintaining the output and quality of molten material from the end-fired melting furnace.

In particular, the invention aims at reducing the nitrogen oxide fraction of the exhaust gas at low cost and without introducing cumbersome additional equipment while maintaining or improving the melting process.

The invention is defined in the appended claims.

The invention provides a method of melting raw materials by an end-fired melting furnace which has:

- a melting tank for receiving raw materials to be melted and for accommodating a melted materials bath;
- a melting chamber located above said melting tank and comprising a first side wall, a second side wall, a back wall located at an upstream area of said melting tank, a front wall located at a downstream area of said melting tank, and a roof;
- first and second ports being provided in said back wall in first and second horizontally spaced locations;
- at least one burner, associated with one of said ports, to inject a first fraction X1 of fuel into said melting chamber, wherein re-circulating combustion products flow in a substantially horizontal loop above a flame; the method comprising:

introducing a second fraction X2 of auxiliary fuel, with X2+X1 being equal to 1, using at least one auxiliary fuel injector, the at least one auxiliary fuel injector being arranged in the end-fired melting furnace in said roof or in said first and second side walls respectively so that the at least one auxiliary fuel injector introduces the second fraction X2 of auxiliary fuel, in the direction of the flow of said re-circulating combustion products, without additional oxidiser, into said re-circulating combustion products, the auxiliary fuel injector being located at a point where said second fraction X2 of auxiliary fuel will mix with the re-circulating combustion products, before reaching incoming oxidiser introduced by a port, the velocities of the jets introducing the fraction X1 of fuel and the fraction X2 of auxiliary fuel being adapted so that the sum of their corresponding jet momenta is comprised between −30% or +30% of a value corresponding to the jet momentum of the fuel when X2 equals zero (and X1 equals 1), and the energy provided by the quantity of the sum of the first fraction of fuel X1 and the second fraction of fuel X2 being adapted to produce a given required energy for melting said materials without over-fuelling the furnace.

Over fuelling refers to an introduction of fuel which is in excess of the amount of fuel which can be burned by available oxidiser. Over fuelling may occur in solutions of the prior art in which fuel is added into the melting chamber such as in Ichiraku.

Thus, the second fraction of auxiliary fuel X2 is introduced in the recirculating combustion products in a manner which enhances the flow of recirculating combustion products, ensuring an effective dilution of the auxiliary fuel to reduce NOx formation.

This results from the position and direction of the jet of auxiliary fuel which introduces the fraction X2 of auxiliary fuel, and from the velocity of the auxiliary injection. It should be noted that this feature is not disclosed in document Ward which is silent on how the auxiliary fuel is introduced. As a matter of fact, in document Ward, the quantity of fuel introduced by a burner may be reduced so as to introduce another quantity of fuel through an auxiliary fuel injector. However, reducing the quantity of fuel introduced by a burner reduces the mass flow (for example expressed in Kg/s) of the recirculating combustion products. The inventors of the present invention have discovered that by changing the direction and the velocity of the injection of the auxiliary fuel, and the velocity of the injection of the burners, it is possible to maintain the mass flow of the recirculating combustion products and thus to obtain a better NOx reduction effect.

The skilled person knows how to determine the required energy for melting materials efficiently for a given furnace and application. The sum of the momenta of the two fluids can be deduced from this energy (at plus or minus 30%). Furthermore, the fractions X1 and X2 may be chosen so as to obtain a desired level of NOx reduction.

Contrary to those known solutions of the prior art which require modifications of the excess (to stoichiometric) oxygen levels leaving the melting chamber, the invention may operate within the existing (corresponding to X2 being equal to zero) stoichiometric levels for a furnace and a specific melting application (with X2 being equal to zero).

It should be noted that the expression "X2+X1 being equal to 1" is equivalent to the expression: the quantity (for example the mass) of fuel per unit time (or the corresponding energy per unit time) introduced in the melting chamber will be divided, or substantially divided, between the fuel introduced through the burner(s) and the auxiliary fuel.

Also, the value corresponding to the jet momentum of the fuel when X2 equals zero corresponds to the value when the fuel is only injected using the burner(s) to operate the furnace and to melt the same materials. Thus, this value corresponds to the normal functioning of the furnace for this application in which the auxiliary fuel injector is not used.

According to a particular embodiment, the auxiliary fuel injector has an orientation which will reinforce the mass flow of the recirculating combustion products.

According to a particular embodiment, the at least one auxiliary fuel injector is arranged so that the direction of the jet of auxiliary fuel forms a first acute angle θ with a horizontal plane and a second acute angle α with a vertical plane parallel to the side walls.

According to a particular embodiment, at least one port is associated with a plurality of individual burners.

According to a particular embodiment, the first fuel and the second auxiliary fuel are different or identical fuels.

In this particular embodiment, when using identical fuels, a fraction of a fuel is routed to the burners and the remainder is routed to the at least one auxiliary fuel injector. When using different fuels, two fuels are used corresponding to a quantity of energy which will be divided between the burners and the at least one auxiliary fuel injector.

According to a particular embodiment, at least one burner and said at least one auxiliary fuel injector each operate with a fuel selected from the group consisting of natural gas, LPG, fuel oil, coke-oven gas, blast furnace gas, reforming gas, biofuel and hydrogen.

According to a particular embodiment, the at least one auxiliary fuel injector is located downstream and within a distance from the back wall which is less than half the length of the furnace.

According to a particular embodiment, the method comprises adjusting or altering the jet momentum of the introduced fraction X2 of auxiliary fuel so as to reinforce the mass flow of re-circulating combustion products. For example, this may be done by the use of a pressurised jet of fuel, air or inert gas, or steam concentric with the Auxiliary fuel jet.

According to a particular embodiment, the method comprises adjusting or turning off some of the burners so as to reinforce the mass flow of re-circulating combustion products.

According to a particular embodiment, the method comprises operating alternately said first and second ports as inlet port for introducing oxidiser and as exhaust port.

According to a particular embodiment the velocity of the jet introducing the second fraction X2 of auxiliary is comprised between 100 m/s and 250 m/s.

The invention further provides an end-fired melting furnace comprising:
- a melting tank for receiving raw materials to be melted and for accommodating a melted materials bath;
- a melting chamber located above said melting tank and comprising a first side wall, a second side wall, a back wall located at an upstream area of said melting tank, a front wall located at a downstream area of said melting tank, and a roof;
- first and second ports being provided in said back wall in first and second horizontally spaced locations;
- at least one burner, associated with one of said ports, to inject a first fraction X1 of fuel into said melting chamber, wherein re-circulating combustion products flow in a substantially horizontal loop above the flame;
- at least one auxiliary fuel injector for introducing a second fraction X2 of auxiliary fuel, with X2+X1 being equal to 1, the at least one auxiliary fuel injector being arranged in the end-fired melting furnace in said roof or in said first and second side walls respectively so that the at least one auxiliary fuel injector introduces the second fraction X2 of auxiliary fuel in the direction of the flow of said re-circulating combustion products,
- a module for controlling the at least one auxiliary fuel injector so that introduces the second fraction X2 of auxiliary fuel,
- without additional oxidiser,
- into said recirculating combustion products, the auxiliary fuel injector being located at a point where said second fraction X2 of auxiliary fuel will mix with the recirculating combustion products, before reaching incoming oxidiser introduced by a port,
- the velocities of the jets introducing the fraction X1 of fuel and the fraction X2 of auxiliary fuel being adapted so that the sum of their corresponding jet momenta is comprised between −30% or ±30% of a value corresponding to the jet momentum of the fuel when X2 equals zero, and
- the energy provided by the quantity of the sum of the first fraction of fuel X1 and the second fraction of fuel X2 being adapted to produce a given required energy for melting said materials without over-fuelling the furnace.

The above defined end-fired melting furnace may be able to perform all the embodiments of the method as defined above.

According to a particular embodiment, the at least one auxiliary fuel injector has an orientation which will reinforce the mass flow of the recirculating combustion products.

According to a particular embodiment, the at least one auxiliary fuel injector is arranged so that the direction of the jet of the auxiliary fuel forms a first acute angle θ with a horizontal plane and a second acute angle α with a vertical plane parallel to the side walls.

According to a particular embodiment, at least one port is associated with a plurality of individual burners.

According to a particular embodiment, the first fuel and the second auxiliary fuel are different or identical fuels.

According to a particular embodiment, said at least one burner and said at least one auxiliary fuel injector each operate with a fuel selected from the group consisting of natural gas, LPG, fuel oil, coke-oven gas, blast furnace gas, reforming gas, biofuel and hydrogen.

According to a particular embodiment, the at least one auxiliary fuel injector is located downstream and within a distance from the back wall which is less than half the length of the furnace.

According to a particular embodiment, the end-fired melting furnace comprises a device for adjusting or altering the jet momentum of the introduced fraction X2 of auxiliary fuel so as to reinforce the mass flow of re-circulating combustion products.

According to a particular embodiment, the end-fired melting furnace comprises a device for adjusting or turning off some of the burners so as to reinforce the mass flow of re-circulating combustion products.

According to a particular embodiment, said first and second ports are configured to operate alternately as inlet port for introducing oxidiser and as exhaust port.

According to a particular embodiment, the velocity of the jet introducing the second fraction X2 of auxiliary is comprised between 100 m/s and 250 m/s.

Other characteristics and advantages of the invention appear from the following description of particular embodiments, given as examples and with reference to the accompanying drawings.

DESCRIPTION OF THE PREFERRED EMBODIMENTS

The present invention will be described in connection with preferred embodiments which are given by way of examples. In the following examples, glass is the material to be melted by the furnace. However, the invention is also directed to the melting of other types of materials. Also, in the following examples, the end-fired melting furnace is a reversing melting furnace. However, the invention also applies to other types of end-fired melting furnaces, and notably to non-reversing end-fired melting furnaces. The features of the different embodiments may be combined unless otherwise stated.

Figure 1:
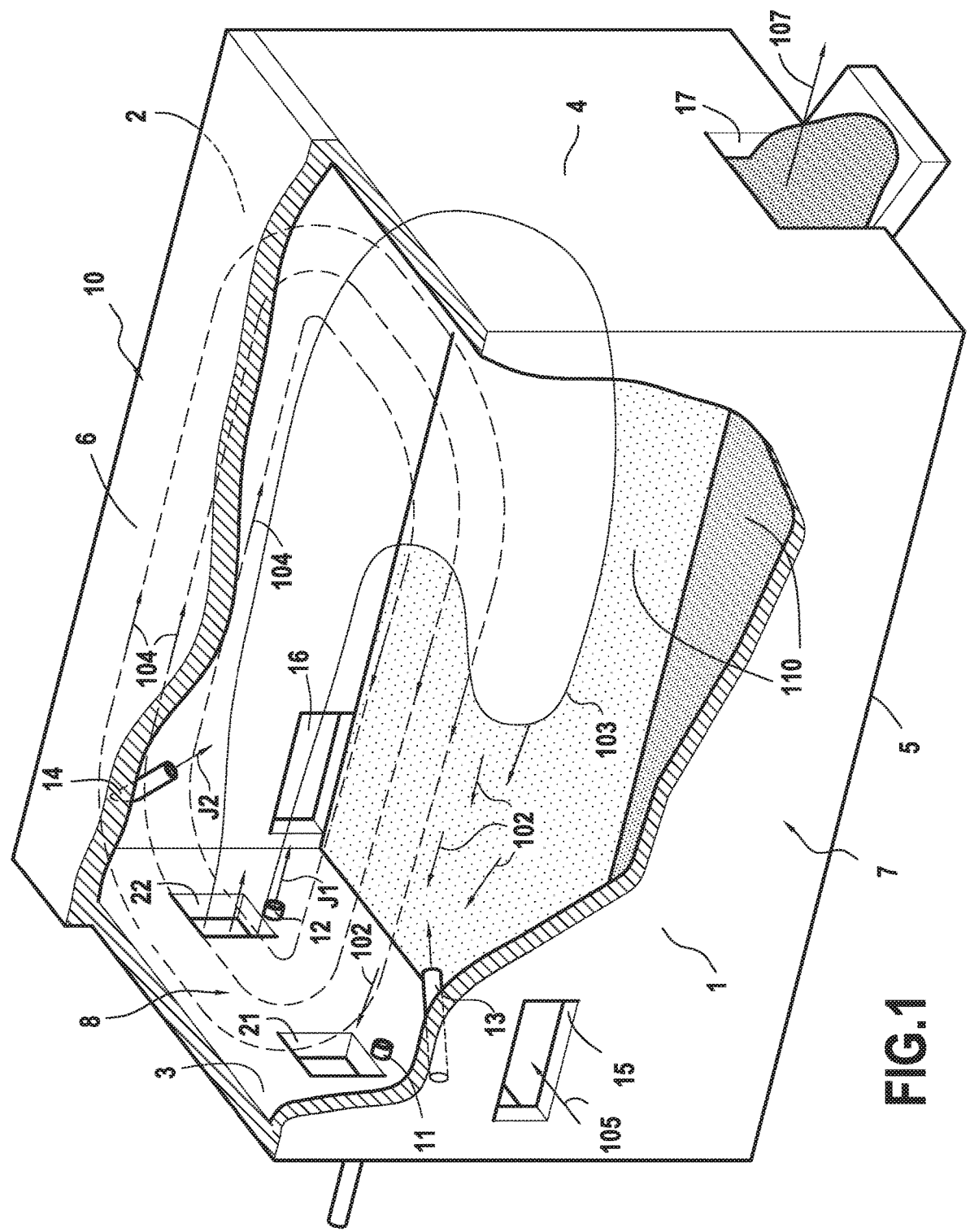
FIG. 1 is a schematic perspective view of an end-fired melting furnace according to the invention, a portion of the furnace casing being removed.

A typical arrangement of an embodiment of the invention is illustrated in FIG. 1, which schematically shows a melting furnace 10, of the type known as end-port furnace, for melting glass in this example.

As shown in FIG. 1, the end-fired glass furnace 10 comprises a melting tank 7 receiving through inlets 15, 16, which are located in an upstream area of the melting tank 7 in side walls thereof, glass to be melted (schematically represented by an arrow 105). The melting tank 7 having a bottom 5 accommodates a melted glass bath 110 and outputs the molten glass (schematically represented by an arrow 107) through an outlet 17, which is located in a downstream area of the melting tank 7 in a front wall 4 thereof.

A melting chamber 8 is located above the melting tank 7 and comprises a first side wall 1, a second side wall 2, a back wall 3 located at the upstream area of the melting tank 7, a front wall 4 located at the downstream area of the melting tank 7, and a roof 6.

First and second ports 21, 22 are provided in the back wall 3 of the melting chamber 8 in first and second horizontally spaced locations. The first and second ports 21, 22 are associated with first and second burners 11, 12 for injecting a first fuel into the melting chamber 8. The first and second ports 21, 22 are alternately operable as an inlet port for introducing oxidiser (for example air) in the chamber and as an exhaust port for combustion products. The first port 21 is an inlet port when the second port 22 is an exhaust port and the first port 21 is an exhaust port when the second port 22 is an inlet port. In the example of FIG. 1, the second port 22 is in a state corresponding to an inlet port and the first port 21 is in a state corresponding to an exhaust port.

As schematically shown in FIG. 1, a heating burner flame 103, created when the second port 22 is operated as an inlet port for introducing oxidiser in the melting chamber 8 and a first fuel is ejected in a jet J1 through the second burner 12, has an elongated shape over the melting bath 110. The combustion of the flame 103 produces combustion products 102 in a return path towards the first port 21 which is an outlet for the combustion products 102.

A proportion of the combustion products recirculate towards the second port 22 and flow around the furnace, above the flame, in a substantially horizontal loop schematically represented by arrows 104. Such recirculation of combustion products has been known to exist in reversing regenerative furnaces since the 1950s (e.g. M W Thring & M P Newby, 'Combustion length of enclosed Turbulent Jet Flames', Symposium (International) on Combustion, 1952, or in document Craya mentioned hereinafter).

Similarly during alternate periods, an almost symmetrical flame is created when the first port 21 is operated as an inlet port and a first fuel is injected through the first burner 11. Coincidentally, combustion products flow to the second port 22 and a recirculation of combustion products occurs above the flame in the counter clockwise direction (dewed from above the furnace).

The first and second ports 21, 22 and the associated first and second burners 11, 12 are thus alternately and repeatedly used to emit respectively an oxidiser (air or oxygen) and a first fuel. The changeover between the first and second ports 21, 22 and correspondingly the first and second burners 11, 12 occurs cyclically, with a cycle time being e.g. between 10 and 30 minutes, more specifically between 20 and 30 minutes. A first fraction X1 of fuel is injected into the melting chamber 8 via the alternately operated first and second burners 11, 12.

In order to reduce the formation of NOx in the end-fired melting furnace 10, the furnace is further equipped with a first auxiliary fuel injector 13 and with a second auxiliary fuel injector 14.

The first auxiliary fuel injector 13 is located on the first side wall 1 and the first auxiliary fuel injector 13 is associated with the first burner 11. More precisely, in a period of time in which the first port 21 introduces oxidiser and the first burner 11 injects fuel, the first auxiliary fuel injector 13 is controlled to inject a second fraction X2 of auxiliary fuel (with X1+X2=1). The first auxiliary fuel injector 13 is located downstream from the first burner 11 within a distance from the back wall 3 equal to half the length of the furnace.

The length of the furnace is the distance between the back wall 3 and the front wall 4.

The second auxiliary fuel injector 14 is located on the second side wall 2 and the second auxiliary fuel injector 14 is associated with the second burner 12. More precisely, in another period of time (corresponding to FIG. 1) in which the second port 22 introduces oxidiser and the second burner 12 injects fuel, the second auxiliary fuel injector is controlled to inject the fraction X2 of auxiliary fuel. The second auxiliary fuel injector is located downstream from the second burner 12 and within a distance from the back wall which is less than half the length of the furnace.

In an alternative, the two auxiliary fuel injectors may be positioned in the roof.

In the example of FIG. 1, the second auxiliary fuel injector 14 introduces, in a jet J2, the second fraction X2 of auxiliary fuel. The second auxiliary fuel injector 14 is arranged so that the introduction of the second fraction X2 of auxiliary fuel is:

in the direction of the flow of said re-circulating combustion products, without additional oxidiser, into said recirculating combustion products, the second auxiliary fuel injector 14 being located at a point where said second fraction X2 of auxiliary fuel will mix with the recirculating combustion products 104, before reaching incoming oxidiser introduced by the second port 22, the velocities of the jets introducing the fraction X1 of fuel and the fraction X2 of auxiliary fuel being adapted so that the sum of their corresponding jet momenta is comprised between −30% or +30% of a value corresponding to the jet momentum of the fuel when X2 equals zero (and X1 equals 1), and the energy provided by the quantity of the sum of the first fraction of fuel X1 and the second fraction of fuel X2 being adapted to produce a given required energy for melting the glass without over-fuelling the furnace.

The fractions X1 and X2 (i.e. the proportion of the fuel entering the furnace which is auxiliary fuel and which is first fuel) are chosen so as to reduce the formation of NOx. The fractions X1 and X2, and their corresponding energies, are chosen so that the entire energy entering the furnace is at the level required for melting the glass (which corresponds to 1, the sum of X1 and X2). Thus, the total quantity of energy required for melting, which may correspond to 100%, is split between the first fraction X1 and the second fraction X2 so as to maintain this 100%.

It should be noted that the total amount of fuel supplied to a melting furnace remains just the amount required to melt the raw materials (for example glass), with combustion completed within the melting chamber under conditions of a small amount of excess oxidiser, as for a conventional combustion system.

The above mentioned recirculation of combustion products extends in a substantially horizontal loop above the flame over a length (measured from an inlet port) which is preferably known so as to find the optimum location for the auxiliary fuel injectors.

$$x = 4.5 \times h \quad (1)$$

in which:

x is the distance from the inlet port wall to the point where there is no longer recirculation in the furnace, h is the height between the glass surface and the furnace roof.

In the case of an end-fired melting furnace, the maximum melting chamber length has evolved over the decades so that the recirculation zone generally reaches the front wall. This avoids a stagnant 'dead' pocket forming over the molten glass near the front wall.

Also, the injection parameters of the auxiliary fuel have to be determined in a manner such that the mass flow of combustion products recirculated is maintained. The strength of the recirculation can be calculated for example using the following equations derived by Craya (Craya A and Curtet R, 'On the spreading of a confined jet', Comptes-rendus de l'Academie des Sciences, Paris, 241, 1955) and others:

$$\frac{qr}{Q} = 0.43(\sqrt{m} - 1.65) \quad (2)$$

$$m = \frac{G0}{Ginf} + \frac{Ga}{2Ginf} - 0.5 \quad (3)$$

in which:

qr is the mass of combustion products recirculating per unit time,

Q is the total mass of fuel and oxidiser entering the furnace per unit time,

G0 is the sum of the jet momenta of incoming fuel jets X1 and X2 (their respective mass flow rates multiplied by their respective velocities), Ga is the momentum of the incoming oxidiser (its mass flow rate multiplied by its velocity).

Ginf is the momentum of the outgoing hot exhaust gases (their mass flow rate multiplied by their mean velocity when they fill the furnace chamber), and m is a dimensionless number (Craya Curtet number) that relates to the relative jet momenta of the incoming fuel and oxidiser flows, and the outgoing combustion products.

As far as the mass flow rate of recirculating combustion products is concerned, typical values for natural gas as fuel and for air as oxidiser together with typical air and gas velocities, when applied to equation (2), suggest that the mass of exhaust gases recirculating in a horizontal loop below the roof and above the flame typically lies in the range from a quarter to 3 quarters of the incoming mass flow of fuel and oxidiser. This confirms that there is sufficient recirculation to support the Auxiliary Injection of up to 100% of the total fuel flow entering the furnace (about ¹⁄₂₀th of the total mass flow entering the furnace) without affecting the furnace flow pattern and furnace operation.

However, as fuel is removed from the burners to supply the Auxiliary fuel injectors (for example because as the second quantity X2 is introduced, the first quantity X1 has to be reduced by the same amount), equation (2) indicates that the recirculation rate will eventually fall to values that are too low to carry the auxiliary fuel and maintain the furnace flow patterns, if the injectors are not in the above defined direction and if they do not inject with the above mentioned velocity.

Figure 2:
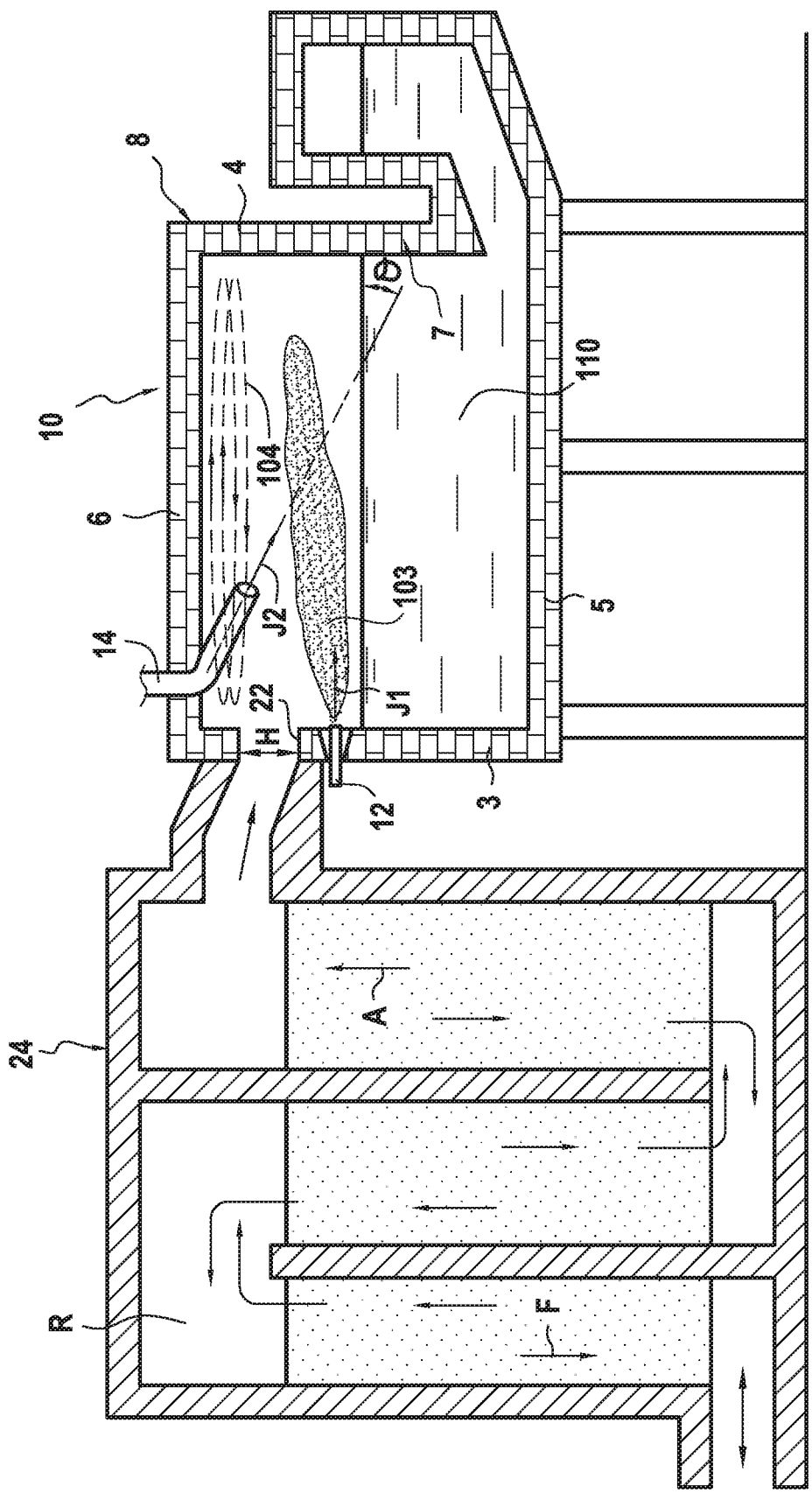
FIG. 2 is a longitudinal vertical sectional view of an end-fired melting according to an embodiment of the invention in which an auxiliary fuel injector is in the roof.

FIG. 2 is a side view of an end-fired melting furnace in which the second auxiliary fuel injector 14 is placed in the roof. The first auxiliary fuel injector 13, although not represented on FIG. 2, is also placed in the roof.

In the example of FIG. 2, the second auxiliary fuel injector 14 is arranged so that the direction of the jet J2 of auxiliary fuel forms a first acute angle θ with a horizontal plane for example the plane defined by surface of the bath of melted glass. The orientation of θ is shown on FIG. 2.

It should be noted that on FIG. 2, the jet J2 is directed downward in the direction of the flow of re-circulating combustion products. In other examples of the invention in which the auxiliary fuel injector is arranged below the re-circulating combustion products, the jet J2 may be directed upward in the direction of the re-circulating combustion products while still forming an acute angle with a horizontal plane.

The angle θ of FIG. 2 is chosen so as to ensure mixing with the recirculating of combustion products. Additionally, this angle may be chosen so as to prevent the auxiliary fuel from attaching to the melting chamber roof. An analogous angle may be defined for auxiliary fuel injectors located in the side walls.

The end-fired melting furnace 10 is represented on FIG. 2 with a second heat exchanger 24 which is operatively associated with the second port 22. As shown in FIG. 2, the cold oxidiser is pre-heated in a part of heat exchanger 24, defining a regenerator R re-heated by combustion products F of a preceding cycle. The pre-heated oxidiser is then directed as hot oxidiser A towards the second port 22 acting as inlet port. The resulting combustion products are then directed towards a first heat exchanger (for example such as the heat exchanger described in another example of furnace on FIG. 3) defining a second regenerator R in order to re-heat it and pre-heat combustion air A to be applied through the first port 21 during the next cycle.

Figure 3:
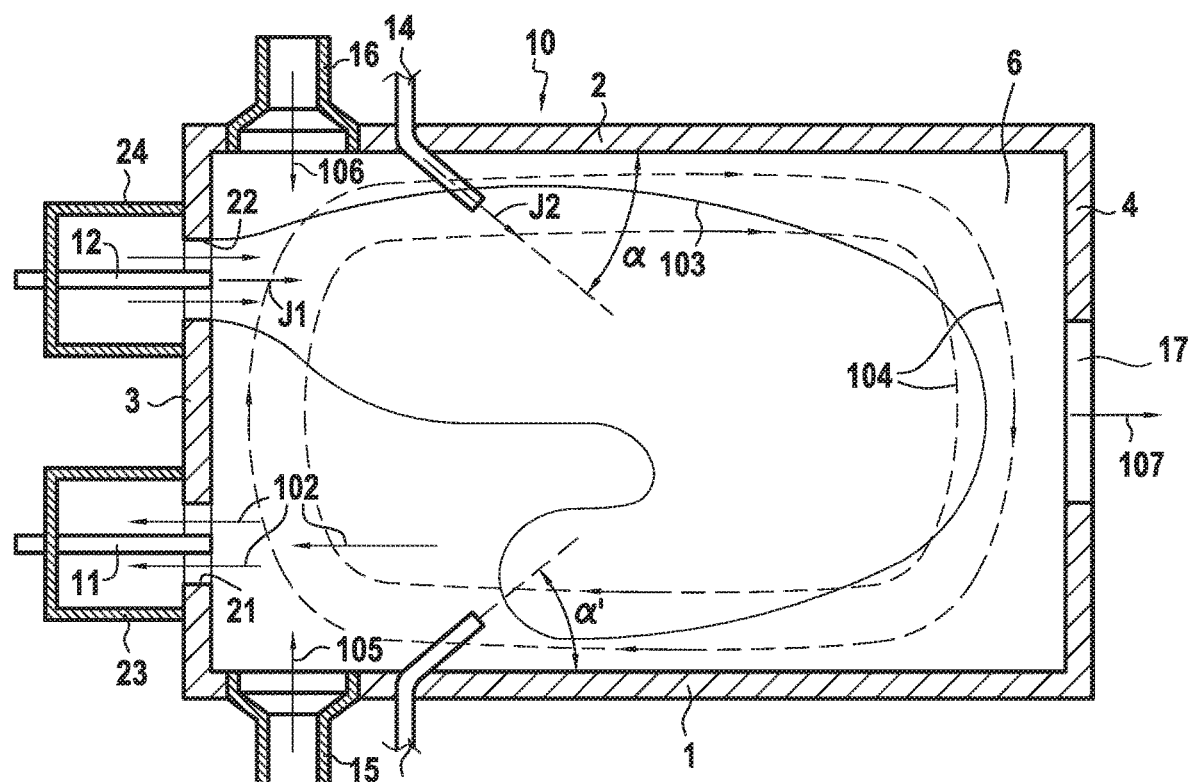
FIG. 3 is a longitudinal horizontal sectional view of the end-fired glass furnace of FIG. 1 seen from above, according to an embodiment of the invention, with a first port being operated as an air intake and a second port being operated as an outlet for combustion products.

FIG. 3 is a top view of the end-fired melting furnace described in reference to FIG. 1.

In the example of FIG. 3, the second auxiliary fuel injector 14 is arranged so that the direction of the jet J2 of the auxiliary fuel forms a second acute angle α with a vertical plane parallel to the side walls. The orientation of α is shown on FIG. 3, as can be seen on the figure, the angle is positive when measured from the side wall having the auxiliary fuel injector (or the closest side wall if the auxiliary fuel injector is in the roof), and more precisely, this acute angle is measured from the portion of the side wall which is the furthest from the back wall 3.

The angle α is chosen so as to ensure mixing with the recirculating combustion products. Analogous angles may be defined for auxiliary fuel injectors located in the roof.

As shown on FIG. 3, the end-fired glass melting furnace is equipped with first and second heat exchangers 23 and 24.

It should be noted that for the first auxiliary fuel injector, another second angle α' may be defined when auxiliary fuel is emitted. The orientation of the second angle α' is also shown on the figure.

Figure 4:
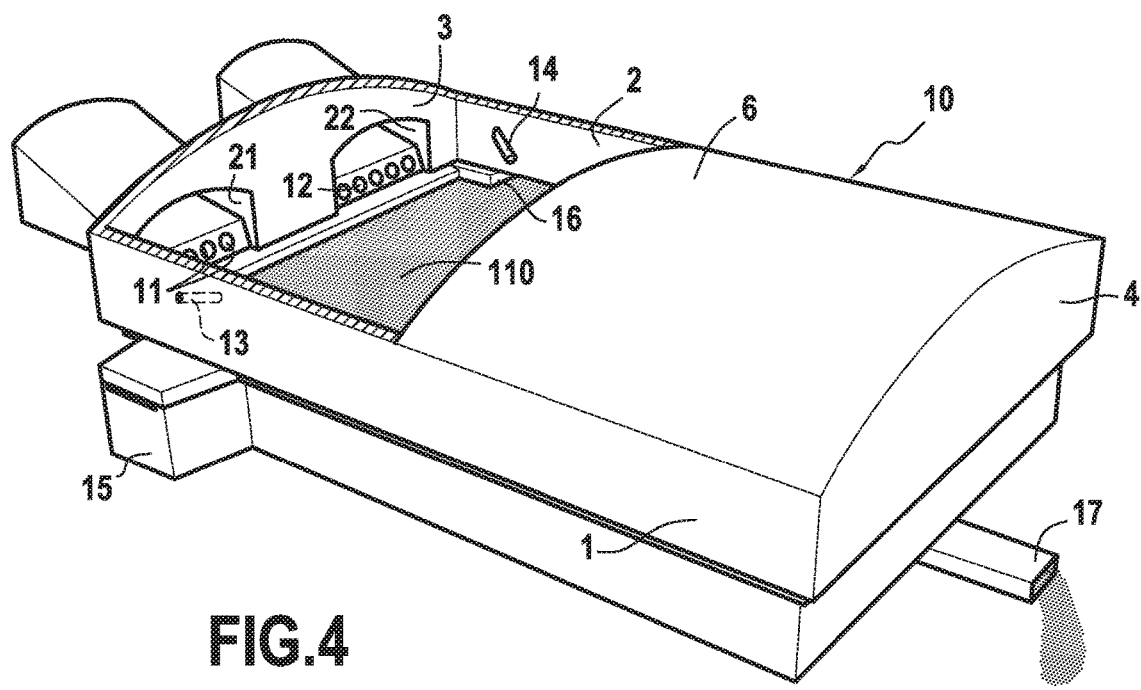
FIG. 4 is a perspective view of an example of an end-fired glass furnace equipped with first and second main burners each comprising a plurality of individual burners according to a variant embodiment of the invention.

The embodiment of FIG. 4 is similar to the embodiment of FIG. 1, but it shows an example of rounded roof 6 and shows that the first and second burners 11, 12 may each comprise a series of several individual under-port burners.

Figure 5:
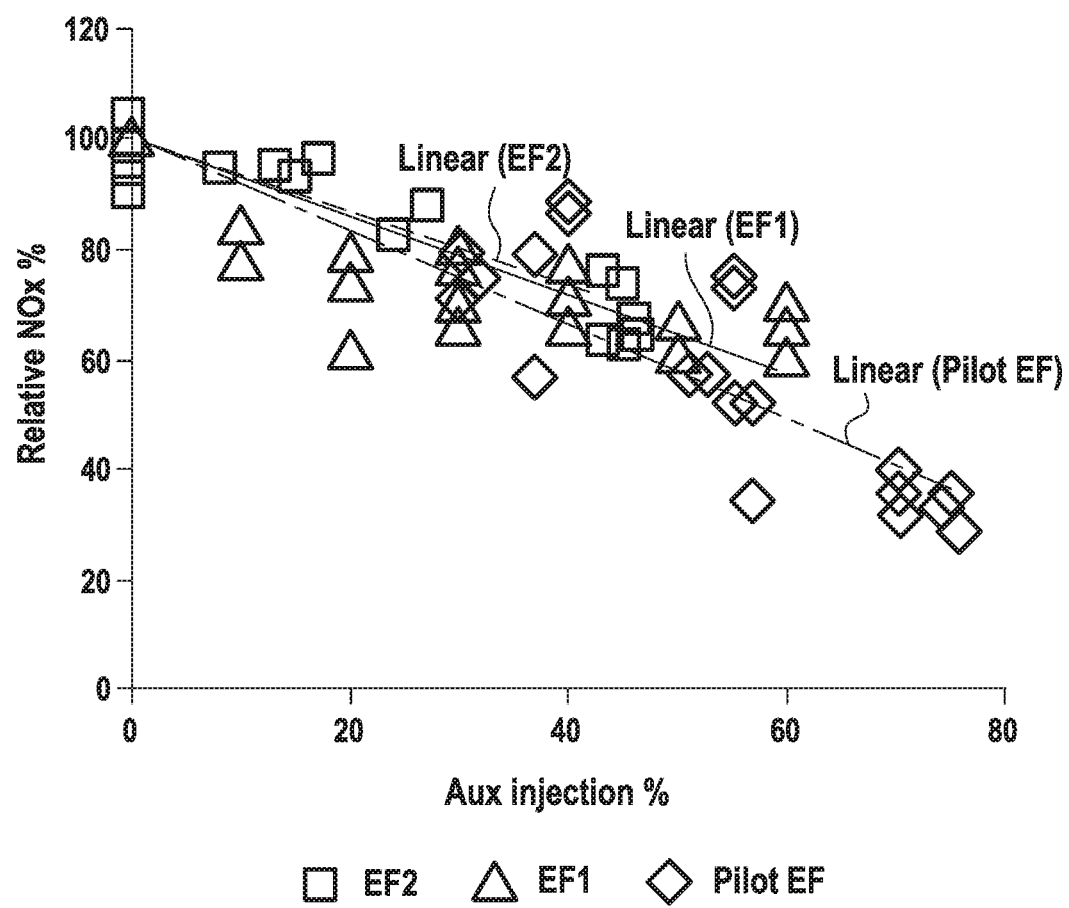
FIG. 5 is a graph showing the reduction of NOx in various furnaces according to the fraction of auxiliary fuel.

FIG. 5 is a graph showing the reduction of NOx in various furnaces according to the fraction of auxiliary fuel. In the examples of this figure, the fraction of fuel introduced through the burners is reduced so that a percentage or fraction of the total energy (or fuel quantity) is introduced by the auxiliary fuel injectors. This figure shows the inverse relationship between the relative percentage of NOx formation and the percentage of auxiliary fuel introduced through the auxiliary injectors as measured on three end-fired glass melting furnace according to the invention and denoted EF1, EF2, and Pilot EF, EF1 and EF2 correspond to production end-fired glass melting furnaces and Pilot EF corresponds to a pilot scale laboratory furnace.

It should be noted that in the above examples, the auxiliary fuel jets emitted by the auxiliary fuel injectors have substantially the same direction as the recirculating combustion products 104. The auxiliary fuel injectors also make it possible to introduce either a fraction of the fuel injected by the burners or a quantity of a different fuel (while maintaining the total energy constant).

It should also be noted that the auxiliary injection of fuel made through the first and second auxiliary is not an additional fuel injection causing after-burning and no additional oxidiser is introduced together with the fuel injected via the first and second auxiliary fuel injectors 13, 14. In embodiments of the invention, the total fuel quantity is not creased (or the total energy if different fuels are used), but there is only a modification of the distribution of the quantity of fuel necessary for the quantity and type of glass to be melted. Due to the auxiliary injection of fuel through the first and second auxiliary fuel injectors 13, 14, one can obtain a better heat transfer towards the glass to be melted and at the same time, NOx formation is reduced.

More specifically, of the fuel injected into the melting chamber 8 through the first and second burners 11 and 12 and the auxiliary fuel injected by auxiliary fuel injectors 13 and 14, the proportion of the fuel jet emitted by the first and second auxiliary fuel injectors 13 and 14 is preferably from 10% to 100% and most preferably about 20% to 50% of the total fuel entering the furnace, the amount being chosen so as to achieve the desired NOx reduction on a given furnace. It should be noted that the proportion may relate to the corresponding energies, especially if the fuel introduced by the burners and the auxiliary fuel introduced by the auxiliary fuel injectors are different.

The fuel injected through the first and second burners 11, 12 and the first and second auxiliary fuel injectors 13, 14 may be selected from the group consisting of natural gas, LPG, fuel oil, coke-oven gas, blast furnace gas, reforming gas, biofuel and hydrogen.

Also, the fuel jets introduced through the first and second auxiliary fuel injectors 13, 14 are substantially in the same direction as the direction of the existing flame 103 and more specifically in the direction of the flow of recirculating combustion products 104 in the first branch of the U-shaped path, but the auxiliary fuel injection is made so as to be mixed in a co-flowing manner with the flow of re-circulated combustion products 108 just above the flame and before mixing with the remaining combustion air (oxidizer).

More specifically, an auxiliary fuel jet may be introduced with a velocity optimized so that said fuel is injected in the re-circulation loop from a certain distance from the exhaust port, as measured around the loop. The velocity and position of the auxiliary fuel jet can be determined by the person skilled in the art in such a way that the auxiliary fuel follows a path long enough to be completely burned inside the furnace.

The injection speed (in m/s) of the auxiliary fuel through an auxiliary fuel injector 13 or 14 may be typically 100 to 250 m/s.

According to another variant embodiment, the first and second auxiliary fuel injectors 13, 14 each include a device to adjust or alter the jet momentum of the introduced second fraction X2 of auxiliary fuel.

According to another variant embodiment, when the quantity of fuel flowing through them is reduced to supply the auxiliary fuel injectors, the burners are adjusted, or some of their number turned off so as to maintain their momentum and hence to maintain the mass flow of combustion products in the recirculation loop, especially when introducing high proportions of auxiliary fuel (more than 30%).

According to another variant embodiment, the first and second auxiliary fuel injectors 13, 14 are located and directed so as to maintain or enhance the mass flow of combustion products in the recirculation loop especially when introducing high proportions of auxiliary fuel (more than 50%).

The invention also relates to a method of melting raw materials by an end-fired melting furnace 10 which has:
- the melting tank 7 for receiving raw materials to be melted and for accommodating a melted materials bath;
- the melting chamber 8 located above said melting tank and comprising a first side wall, a second side wall, a back wall located at an upstream area of said melting tank, a front wall located at a downstream area of said melting tank, and a roof;
- first and second ports 21, 22 provided in said back wall in first and second horizontally spaced locations;
- at least one burner 11, 12, associated with one of said ports, to inject a first fraction X1 of fuel into said melting chamber, wherein re-circulating combustion products 104 flow in a substantially horizontal loop above a flame 103; the method comprising:
introducing a second fraction X2 of auxiliary fuel, with X2+X1 being equal to 1, using at least one auxiliary fuel injector 13, 14, the at least one auxiliary fuel injector being arranged in the end-fired melting furnace in said roof or in said first and second side walls respectively so that the at least one auxiliary fuel injector introduces the second fraction X2 of auxiliary fuel,
in the direction of the flow of said re-circulating combustion products 104,
without additional oxidiser,
into said re-circulating combustion products, the auxiliary fuel injector being located at a point where said second fraction X2 of auxiliary fuel will mix with the re-circulating combustion products, before reaching incoming oxidiser introduced by a port,
the velocities of the jets introducing the fraction X1 of fuel and the fraction X2 of auxiliary fuel being adapted so that the sum of their corresponding jet momenta is comprised between −30% or +30% of a value corresponding to the jet momentum of the fuel when X2 equals zero, and
the energy provided by the quantity of the sum of the first fraction of fuel X1 and the second fraction of fuel X2 being adapted to produce a given required energy for melting said materials without over-fuelling the furnace.

What is claimed is:

1. A method of melting raw materials by an end-fired melting furnace which has:
   a melting tank configured to receive the raw materials to be melted and to accommodate a melted materials bath;
   a melting chamber located above the melting tank and comprising a first side wall, a second side wall, a back wall located at an upstream area of the melting tank, a front wall located at a downstream area of the melting tank, and a roof;
   first and second ports provided in the back wall in first and second horizontally spaced locations; and
   at least one burner, associated with one of the ports, configured to inject a first fraction X1 of fuel into the melting chamber;
   wherein re-circulating combustion products flow in a substantially horizontal loop above a flame;

the method comprising:
   introducing a second fraction X2 of auxiliary fuel, with X2+X1 being equal to 1, using at least one auxiliary fuel injector, the at least one auxiliary fuel injector arranged in the end-fired melting furnace in the roof or in the first and second side walls so that the at least one auxiliary fuel injector introduces the second fraction X2 of auxiliary fuel:
   in a direction of the flow of the re-circulating combustion products;
   without additional oxidiser;
   into the re-circulating combustion products, the at least one auxiliary fuel injector located at a point where the second fraction X2 of auxiliary fuel will mix with the re-circulating combustion products before reaching incoming oxidiser;
   such that velocities of jets introducing the first fraction X1 of fuel and the second fraction X2 of auxiliary fuel are adapted so that a sum of their corresponding jet momenta is between −30% and +30% of a value corresponding to the jet momentum of the fuel when X2 equals zero; and
   such that energy provided by a quantity of a sum of the first fraction X1 of fuel and the second fraction X2 of auxiliary fuel is adapted to produce a given energy for melting the raw materials without over-fuelling the furnace.

2. The method of claim 1, wherein the at least one auxiliary fuel injector has an orientation which will reinforce a mass flow of the re-circulating combustion products.

3. The method of claim 2, wherein the at least one auxiliary fuel injector is arranged so that a direction of the jet of auxiliary fuel forms a first acute angle θ with a horizontal plane and a second acute angle α with a vertical plane parallel to the side walls.

4. The method of claim 1, wherein at least one of the first and second ports is associated with a plurality of individual burners.

5. The method of claim 4, further comprising:
   adjusting or turning off some of the burners so as to reinforce a mass flow of the re-circulating combustion products.

6. The method of claim 1, wherein the fuel and the auxiliary fuel are different or identical fuels.

7. The method of claim 1, wherein the at least one burner and the at least one auxiliary fuel injector each operate with a fuel selected from the group consisting of: natural gas, LPG, fuel oil, coke-oven gas, blast furnace gas, reforming gas, biofuel and hydrogen.

8. The method of claim 1, wherein the at least one auxiliary fuel injector is located downstream and within a distance from the back wall that is less than half a length of the furnace.

9. The method of claim 1, further comprising:
   adjusting or altering the jet momentum of the introduced second fraction X2 of auxiliary fuel so as to reinforce a mass flow of the re-circulating combustion products.

10. The method of claim 1, further comprising:
    alternately operating the first and second ports as an inlet port for introducing oxidiser and as an exhaust port.

11. The method of claim 1, wherein the velocity of the jet introducing the second fraction X2 of auxiliary fuel is between 100 m/s and 250 m/s.

12. An end-fired melting furnace comprising:
    a melting tank configured to receive raw materials to be melted and to accommodate a melted materials bath;

a melting chamber located above the melting tank and comprising a first side wall, a second side wall, a back wall located at an upstream area of the melting tank, a front wall located at a downstream area of the melting tank, and a roof;

first and second ports provided in the back wall in first and second horizontally spaced locations;

at least one burner, associated with one of the ports, configured to inject a first fraction X1 of fuel into the melting chamber, wherein the furnace is configured such that re-circulating combustion products flow in a substantially horizontal loop above a flame; and at least one auxiliary fuel injector configured to introduce a second fraction X2 of auxiliary fuel, with X2+X1 being equal to 1, the at least one auxiliary fuel injector arranged in the end-fired melting furnace in the roof or in the first and second side walls, the at least one auxiliary fuel injector configured to introduce the second fraction X2 of auxiliary fuel in a direction of the flow of the re-circulating combustion products;

wherein the at least one auxiliary fuel injector is oriented and controllable so that the at least one auxiliary fuel injector introduces, in an adjustable manner, the second fraction X2 of auxiliary fuel:

without additional oxidiser;

into the re-circulating combustion products, the at least one auxiliary fuel injector located at a point where the second fraction X2 of auxiliary fuel will mix with the re-circulating combustion products before reaching incoming oxidiser;

such that velocities of jets introducing the first fraction X1 of fuel and the second fraction X2 of auxiliary fuel are adapted so that a sum of their corresponding jet momenta is between −30% and +30% of a value corresponding to the jet momentum of the fuel when X2 equals zero; and such that energy provided by a quantity of a sum of the first fraction X1 of fuel and the second fraction X2 of auxiliary fuel is adapted to produce a given energy for melting the raw materials without over-fuelling the furnace.

13. The end-fired melting furnace of claim 12, wherein the at least one auxiliary fuel injector has an orientation which will reinforce a mass flow of the re-circulating combustion products.

14. The end-fired melting furnace of claim 13, wherein the at least one auxiliary fuel injector is arranged so that a direction of the jet of auxiliary fuel forms a first acute angle $\theta$ with a horizontal plane and a second acute angle $\alpha$ with a vertical plane parallel to the side walls.

15. The end-fired melting furnace of claim 12, wherein at least one of the first and second ports is associated with a plurality of individual burners.

16. The end-fired melting furnace of claim 15, wherein the burners are configured to be controlled to reinforce a mass flow of the re-circulating combustion products.

17. The end-fired melting furnace of claim 12, wherein the at least one auxiliary fuel injector is configured to adjust or alter the jet momentum of the introduced second fraction X2 of auxiliary fuel so as to reinforce a mass flow of the re-circulating combustion products.

18. The end-fired melting furnace of claim 12, wherein the at least one auxiliary fuel injector is located within a distance from the back wall that is less than half a length of the furnace.

19. The end-fired melting furnace of claim 12, wherein the first and second ports are configured to be alternately operated as an inlet port for introducing oxidiser and as an exhaust port.

20. An end-fired melting furnace comprising:

a melting tank configured to receive one or more raw materials;

a melting chamber located above the melting tank;

multiple ports into the melting chamber;

at least one burner configured to inject a first fraction of fuel into the melting chamber; and at least one auxiliary fuel injector configured to introduce a second fraction of fuel in a direction of a flow of re-circulating combustion products in the furnace;

wherein the at least one auxiliary fuel injector is oriented and controllable so that the at least one auxiliary fuel injector introduces, in an adjustable manner, the second fraction of fuel:

without additional oxidiser;

into the re-circulating combustion products before reaching incoming oxidiser;

such that velocities of jets introducing the first fraction of fuel and the second fraction of fuel are adapted so that a sum of their corresponding jet momenta is between −30% and +30% of a value corresponding to the jet momentum of the first fraction of fuel when the second fraction equals zero; and such that the first fraction of fuel and the second fraction of fuel provide a given energy for melting the one or more raw materials without over-fuelling the furnace.

* * * * *